(12) United States Patent
Kim et al.

(10) Patent No.: US 10,524,102 B2
(45) Date of Patent: Dec. 31, 2019

(54) METHOD FOR PROVIDING SERVICE IN WIRELESS NETWORK AND ELECTRONIC DEVICE THEREOF

(71) Applicant: Samsung Electronics Co., Ltd., Suwon-si, Gyeonggi-do (KR)

(72) Inventors: Hyun-Jung Kim, Suwon-si (KR); Kiseok Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 545 days.

(21) Appl. No.: 15/165,412

(22) Filed: May 26, 2016

(65) Prior Publication Data
US 2017/0180972 A1 Jun. 22, 2017

(30) Foreign Application Priority Data
Dec. 22, 2015 (KR) .................... 10-2015-0183984

(51) Int. Cl.
*G06Q 30/02* (2012.01)
*H04W 4/80* (2018.01)
(Continued)

(52) U.S. Cl.
CPC .......... *H04W 4/80* (2018.02); *G06Q 30/0207* (2013.01); *G06Q 30/0261* (2013.01);
(Continued)

(58) Field of Classification Search
CPC ...................................... G06Q 30/0207–0277
See application file for complete search history.

(56) References Cited

U.S. PATENT DOCUMENTS 8,781,502 B1 7/2014 Middleton et al.
2013/0005386 A1* 1/2013 Kopikare ............. H04W 8/005
455/517

(Continued)

FOREIGN PATENT DOCUMENTS

| WO | 2011111952 A1 | 9/2011 |
| WO | 2015026862 A1 | 2/2015 |
| WO | 2015102235 A1 | 7/2015 |

OTHER PUBLICATIONS

European Search Report dated Aug. 21, 2018, issued in the European Application No. 16879126.7-1217 PCT/KR2016010161.

*Primary Examiner* — Sam Refai
(74) *Attorney, Agent, or Firm* — Jefferson IP Law, LLP

(57) ABSTRACT

The present disclosure relates to a sensor network, Machine Type Communication (MTC), Machine-to-Machine (M2M) communication, and technology for Internet of Things (IoT). The present disclosure may be applied to intelligent services based on the above technologies, such as smart home, smart building, smart city, smart car, connected car, health care, digital education, smart retail, security and safety services. The present disclosure provides a method for operating an electronic device. The method comprises transmitting a signal including a list of one or more objects, receiving a signal including beacon recognition information of at least one object included in the list of one or more objects, storing the beacon recognition information, and making a request for information on the at least one object to a server when receiving at least one beacon signal that matches with the stored beacon recognition information.

14 Claims, 13 Drawing Sheets

(51) Int. Cl.
*H04W 4/021* (2018.01)
*H04W 4/23* (2018.01)

(52) U.S. Cl.
CPC ..... *G06Q 30/0267* (2013.01); *G06Q 30/0269* (2013.01); *H04W 4/021* (2013.01); *H04W 4/23* (2018.02)

(56) References Cited

U.S. PATENT DOCUMENTS

| | | |
|---|---|---|
| 2013/0226704 A1 | 8/2013 | Fernandez |
| 2014/0172621 A1* | 6/2014 | Vittolia .............. G06Q 30/0631 705/26.7 |
| 2014/0282620 A1 | 9/2014 | Vouvo et al. |
| 2015/0005011 A1 | 1/2015 | Nehrenz et al. |
| 2015/0079942 A1* | 3/2015 | Kostka .................... H04W 4/21 455/411 |
| 2015/0140982 A1* | 5/2015 | Postrel .................... H04W 4/12 455/418 |
| 2015/0351008 A1 | 12/2015 | Mayor |

\* cited by examiner

METHOD FOR PROVIDING SERVICE IN WIRELESS NETWORK AND ELECTRONIC DEVICE THEREOF

CROSS-REFERENCE TO RELATED APPLICATION(S)

This application claims the benefit under 35 U.S.C. § 119(a) of a Korean patent application filed on Dec. 22, 2015 in the Korean Intellectual Property Office and assigned Serial number 10-2015-0183984, the entire disclosure of which is hereby incorporated by reference.

TECHNICAL FIELD

The present disclosure relates to a method for providing a service in a wireless network and an electronic device thereof.

BACKGROUND

The Internet has evolved from a human-centered connection network in which human beings generate and consume information into the Internet of things (IoT) network in which distributed components such as things exchange information with each other to process the information. The Internet of everything (IoE) technology has emerged, in which a big data processing technology and the like is combined with the IoT technology through the connection with a cloud server and the like. In order to implement the IoT, technical components such as a sensing technology, wired/wireless communication, network infrastructure, a service interface technology, and a security technology are required, and in recent years, technologies such as a sensor network for connection between things, machine to machine (M2M), and machine type communication (MTC) have been developed.

In the IoT environment, an intelligent Internet technology (IT) service may be provided to create a new value for a person's life by collecting and analyzing data generated in the connected things. The IoT may be applied to fields such as a smart home, smart building, smart city, smart car, connected car, smart grid, health care, smart home appliances, and advanced medical service through the convergence and integration between the ITs of the related art and various industries.

There has been proposed a Bluetooth low energy (BLE) beacon utilizing BLE as a communication technology replacing near field communication (NFC) that is short-range wireless communication. The BLE beacon was commercialized in various fields including provision of location information, marketing, purchasing, automatic check-in, or the like.

The NFC has an effective communication distance of about 4 cm to 20 cm, whereas the BLE beacon has an expanded effective communication distance of about 5 cm to 50 m. The NFC has a requirement that a separate chip is installed in each mobile communication terminal. However, short-range wireless communication using the beacon is possible only with a BLE recognition function in the BLE beacon. Therefore, the BLE beacon may provide a more economical wireless communication service even in a large room, compared with the NFC.

The BLE beacon has low power consumption to provide a wireless communication service only using a penny-sized battery for more than one year. Although the number of slave devices is limited to seven in the Bluetooth technology of the related art, it is possible to synchronize with the unlimited number of slave devices starting in a newer version of the BLE 4.0.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for providing a service in a wireless network and an electronic device thereof.

In accordance with an aspect of the present disclosure, a method for operating an electronic device is provided. The method includes transmitting a signal including a list of one or more objects, receiving a signal including beacon recognition information of at least one object included in the list of one or more objects, storing the beacon recognition information, and making a request for information on the at least one object to a server when receiving at least one beacon signal that matches with the stored beacon recognition information.

In accordance with another aspect of the present disclosure, a method for operating a server is provided. The method includes receiving a signal including a list of one or more objects from an electronic device, allocating beacon recognition information of at least one object included in the list of one or more objects, transmitting a signal including the beacon recognition information to the electronic device, receiving a signal requesting information on the at least one object from the electronic device, and transmitting a signal including information on the at least one object to the electronic device, wherein the receiving of the signal requesting information on the at least one object includes receiving the signal requesting information on the at least one object from the electronic device when the electronic device receives at least one beacon signal that matches with the beacon recognition information.

In accordance with another aspect of the present disclosure, an electronic device is provided. The electronic device includes a transceiver configured to transmit and receive a signal to and from a server or a beacon device, and a processor functionally coupled to the transceiver, wherein the processor is configured to control to transmit a signal including a list of one or more objects, receive a signal including beacon recognition information of at least one object included in the list of one or more objects, store the beacon recognition information, and make a request for information on the at least one object to a server when receiving at least one beacon signal that matches with the stored beacon recognition information.

In accordance with another aspect of the present disclosure, a server is provided. The server includes a transceiver configured to transmit and receive a signal to and from an electronic device, and a processor functionally coupled to the transceiver, wherein the processor is configured to control to receive a signal including a list of one or more objects from an electronic device, allocate beacon recognition information of at least one object included in the list of one or more objects, transmit a signal including the beacon recognition information to the electronic device, receive a signal requesting information on the at least one object from the electronic device, and transmit the signal including information on the at least one object to the electronic device, and wherein the signal requesting information on the at least one object is transmitted to the server from the electronic device when the electronic device receives at least one beacon signal that matches with the beacon recognition information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The following disclosure describes a technique that can selectively receive a beacon signal in a wireless network environment.

Terms referring each object (for example, a server and an electronic device) used in the following description, terms referring a signal (for example, a packet, a message) to be transmitted/received between objects, terms indicating a state (for example, user state information, object state information), and the like are exemplified for convenience of description. Accordingly, the present disclosure is not limited to terms which will be described later, and other words having the same technical meaning can be used.

Figure 1:
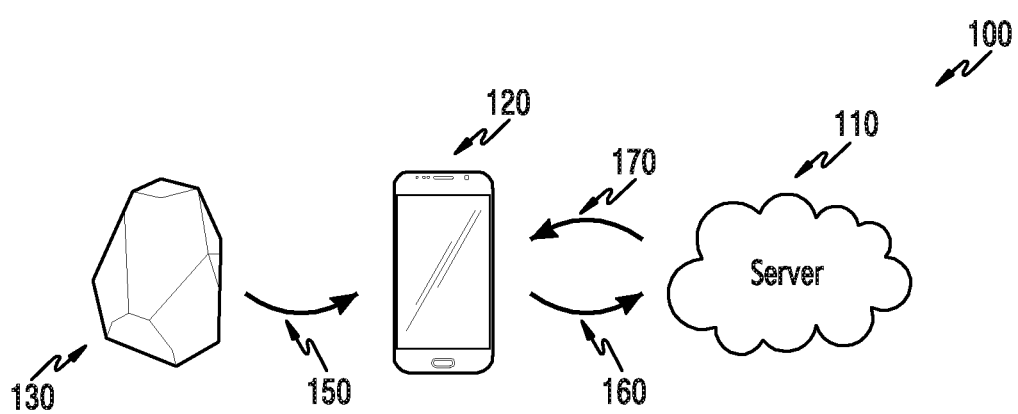
FIG. 1 illustrates a wireless network environment according to various embodiments of the present disclosure.

FIG. 1 illustrates a wireless network environment according to various embodiments of the present disclosure.

Referring to FIG. 1, a network environment 100 includes a server 110, an electronic device 120, and a beacon device 130.

The server 110 may be located within the network environment 100, and may be located outside the network environment 100. For instance, the server 110 may be a server located inside a building, and may be a cloud server which is outside of the building. The server 110 may store various data. For example, the server 110 may store the user state information. Here, the user status information means various states of the user who will use the service. In addition, the server 110 may store object state information. Here, the object may include various meanings depending on an implementation method. For example, the object may refer to a product sold in a store. For another example, the object may refer to a medical service provided by a hospital. In this case, the medical service refers to a medical department in which the user wants to receive a medical treatment, a doctor who makes a diagnosis, a free diagnostic service, etc. In another example, the object may refer to disaster prevention goods such as a gas mask and a fire extinguisher provided in the building. The object state information means various current states of the object that of which the user wants to receive a service. Detailed examples relating to the user state information and the object state information will be described in detail in FIG. 3.

The electronic device 120 may include various devices for communicating with the server 110 and the beacon device 130. For example, the electronic device 120 may be a mobile phone, a smart phone, a personal digital assistant (PDA), a portable multimedia player (PMP), a digital camera, a music player, a portable game console, a navigation system, a laptop computer, a wearable device and the like.

The beacon device 130 refers to a device for transmitting a wireless signal to the electronic device 120. For convenience of description, the present disclosure defines the wireless signal as a beacon signal. The beacon device 130 may transmit a beacon signal 150 to the electronic device 120 through various communication methods. For example, the beacon device 130 may transmit a beacon signal 150 through Wi-Fi direct, infrared ray communication (IR), Bluetooth, ZigBee, Z-Wave, visible light communication (VLC), $3^{rd}$ generation (3G), long term evolution (LTE), etc. The beacon device 130 may broadcast the fixed information included in a packet to the electronic device 120. The fixed information may include various pieces of information. For example, the beacon signal 150 may include an identifier of the beacon device 130. In addition, the beacon signal 150 may include schematic information on the object. For example, the beacon signal 150 may include the identification information of the object.

Each beacon device may transmit the beacon signal 150 to the electronic device 120 through a predetermined strength of a signal. That is, electronic device 120 may receive the beacon signal 150 when positioned within the effective range of the beacon signal 150 transmitted by the beacon device 130. For example, the effective range of the beacon signal 150 may be 50 m. In this case, electronic device 120 may receive the beacon signal 150 when positioned within 50 m from the beacon device 130.

The electronic device 120 may transmit a message 160 to the server 110. The electronic device 120 may transmit a message 160 to the server 110 through various methods.

In some embodiments, electronic device 120 may establish a long distance communication with the server 110. For example, in order to execute or control an application, the electronic device 120 may be connected to a network through a wide area network (WAN) communication scheme so as to communicate with the server 110. For example, the electronic device 120 may perform the communication with the server 110 by using LTE and worldwide interoperability for microwave access (WiMAX) standards. For example, the electronic device 120 may communicate with the server 110 by using a transmission control protocol (TCP). In another example, the electronic device 120 may communicate with the server 110 by using a multiple access scheme such as code division multiple access (CDMA), wideband CDMA (WCDMA), orthogonal frequency multiple access (OFMA), filter bank multi carrier (FBMC), non-orthogonal multiple access (NOMA), sparse code multiple access (SCMA), or the like In some embodiments, the electronic device 120 may establish a nearby communication with the server 110. For example, in order to execute or control an application, the electronic device 120 may communicate with the server 110 through a nearby communication scheme. For example, the electronic device 120 may communicate with the server 110 through a device to device (D2D) scheme such as Bluetooth, Bluetooth low energy (BLE), Wi-Fi direct, and LTE.

The message 160 may include various pieces of information. In some embodiments, the message 160 may include information indicating that the electronic device 120 has entered a predetermined area. The meaning of the predetermined area may be determined according to various embodiments. For example, if the user wishes to purchase a product, the area may refer to an entrance of a store which sells the product. For another example, if the user is to be provided with medical services, the area may refer to an entrance of a hospital. For still another example, when a user wants to receive a service related to disaster prevention, the area may refer to an entrance of a specific building.

In some other embodiments, the message 160 may include information on a list of objects stored in the electronic device 120. The list of objects may be stored in the electronic device 120 in various methods. For example, the list of objects may be a service that the user wants to receive and may be manually recorded by the user on the electronic device 120. For another example, the list of objects may be generated by the recommendation of another user who has received the service. For still another example, the list of objects may be a list of objects recommended by a service provider. For an embodiment, the message 160 may include the identifier (ID) of the electronic device 120.

The server 110 may transmit a message 170 to the electronic device 120. The message 170 may include various pieces of information. In some embodiments, the message 170 may include information on the product. The information on the product may include detailed information on the product that the user wants to purchase. For example, information on the product may include various characteristics of the product such as a category, price, color, and manufacturer of the product. In some embodiments, the message 170 may include information on a medical service. Information on the medical service may include detailed information on the medical service the user wants to receive. For example, information on the medical service may include information on a doctor in charge and information indicating whether the medical service can be currently provided or not. In some other embodiments, the message 170 may include detailed information on the disaster prevention goods the user wants to receive. For example, the information on the disaster prevention goods may include a detailed location of the disaster prevention goods (for example, information indicating that the fire extinguisher is located at an entrance of a second floor emergency staircase), a method for using the disaster prevention goods, or the like.

The information on the object may be generated in various formats by the server 110. For example, the information on the product may be a uniform resource location (URL), text, an image, and a video.

As described above, the beacon signal is a technique for transmitting the fixed information to the electronic device by using low power energy. A packet structure of the beacon signal is described below in order to explain the characteristics of the beacon signal.

Figure 2:
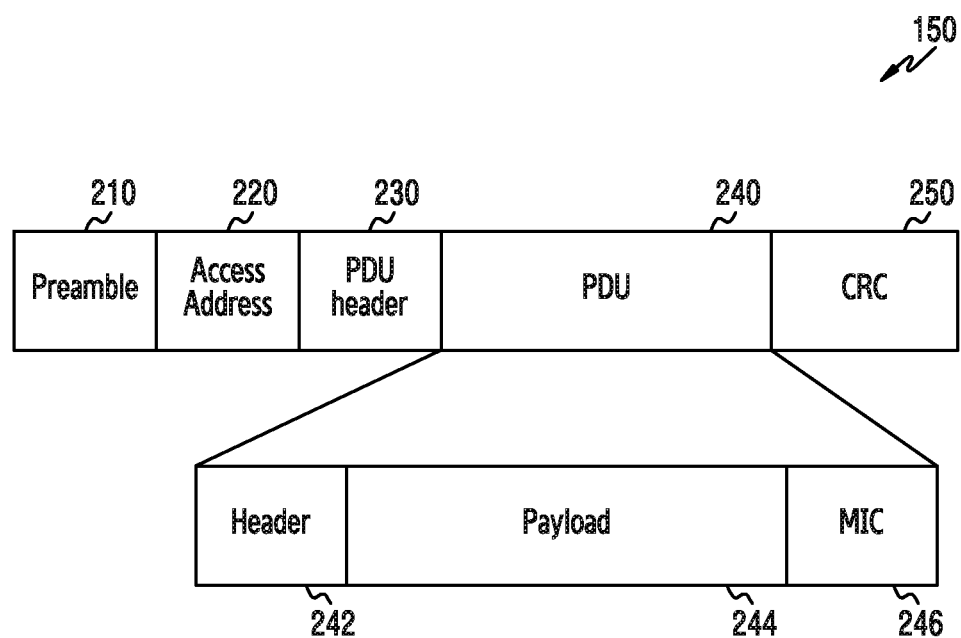
FIG. 2 shows a packet structure of a beacon signal according to various embodiments of the present disclosure.

FIG. 2 shows a packet structure of a beacon signal according to various embodiments of the present disclosure. The packet structure of the beacon signal may correspond to the beacon signal 150 shown in FIG. 1.

Referring to FIG. 2, the beacon signal 150 includes a preamble 210, an access address 220, a protocol data unit (PDU) header 230, a PDU payload 240, cyclic redundancy check (CRC) 250, etc. For convenience of description, FIG. 2 illustrates only the above elements, but in some cases, various modifications are possible. For example, the size of the PDU payload 240 can vary according to power consumption and the size of the fixed information of the beacon device 130, and the PDU header 230 or the CRC 250 may be omitted. For another example, the data size of the preamble 210 may be 1 byte, the data size of the access address 220 may be 4 bytes, the data size of the PDU payload 240 may be 2 bytes to 39 bytes, and the data size of the CRC 250 may be 3 bytes.

The preamble 210 is used to stably transmit and receive the beacon signal 150. For example, the electronic device 120 may perform frequency synchronization of the beacon signal 150 transmitted from the beacon device 130, symbol timing estimation, and automatic gain control by using the preamble 210. The access address 220 is a field for identifying the beacon signal on a physical layer channel. For example, the electronic device 120 may identify, by using the access address 220, whether the current transmitted signal is a signal transmitted from an advertising channel or a signal transmitted from a data physical channel. The advertising channel is a channel for advertising a packet on the channel so as to connect two or more devices. The data physical channel is a channel for communicating between two or more devices connected with each other. The PDU header 230 may include information associated with logical transport, logical link identifiers, etc. For example, the PDU header 230 may include information of the PDU payload 240 (for example, the length of the PDU payload 240). The PDU payload 240 may include information on a logical link control and adaptation protocol (L2CAP) signal, L2CAP frames, or user data. For example, the PDU payload 240 may include a product ID or information for distinguishing the beacon device 130 from other beacon devices. The CRC 250 may include information associated with data transmission error detection.

In some embodiments, the beacon signal 150 may include a packet structure of a beacon signal transmitted over the advertising channel. If the beacon signal 150 is a beacon signal transmitted over the advertising channel, the PDU payload 240 may include a header 242 and a payload 244. The header 242 includes information on a PDU type, a resynchronous function unit (RFU), a Tx address type, an Rx address type, a packet length, etc. The payload 244 includes data information on reception from the beacon device. For example, the payload 244 may include an object ID or information for distinguishing the beacon device 130 from other beacon devices. Depending on the implementation method, a part of the elements of the header 242 and the payload 244 may be omitted, and other elements may be added. Further, the data size of the header 242 and the payload 244 may be fixed or variable according to the implementation method. For example, the data size of the header 242 may be 2 bytes, and the data size of the payload 244 may be 0 to 37 bytes.

In some other embodiments, the beacon signal 150 may include a packet structure of a beacon signal transmitted over the data physical channel. When the beacon signal 150 is a beacon signal transmitted over the physical channel, the PDU payload 240 may include the header 242, the payload 244, and a message integrity check (MIC) 246. The header 242 includes logical link identifier (LLID), next expected sequence number (NESN), sequence number (SN), more data (MD), and length information. The data size of the header 242, the payload 244, and the MIC 246 may be fixed or variable according to the implementation method. For example, the data size of the header 242 may be 2 bytes, the data size of the payload 244 may be 0 to 37 bytes, and the data size of the MIC 246 may be 4 bytes.

The electronic device may receive, from the beacon device, information included in the beacon signal described above. However, when the beacon signal is transmitted over the advertising channel, the beacon signal may be indiscriminately transmitted to the electronic device. In other words, the user of the electronic device may receive undesired information from the beacon device. Thus, a network environment capable of selectively receiving a beacon signal is required. Hereinafter, a method and device which can selectively receive a beacon signal according to various embodiments is provided.

Figure 3:
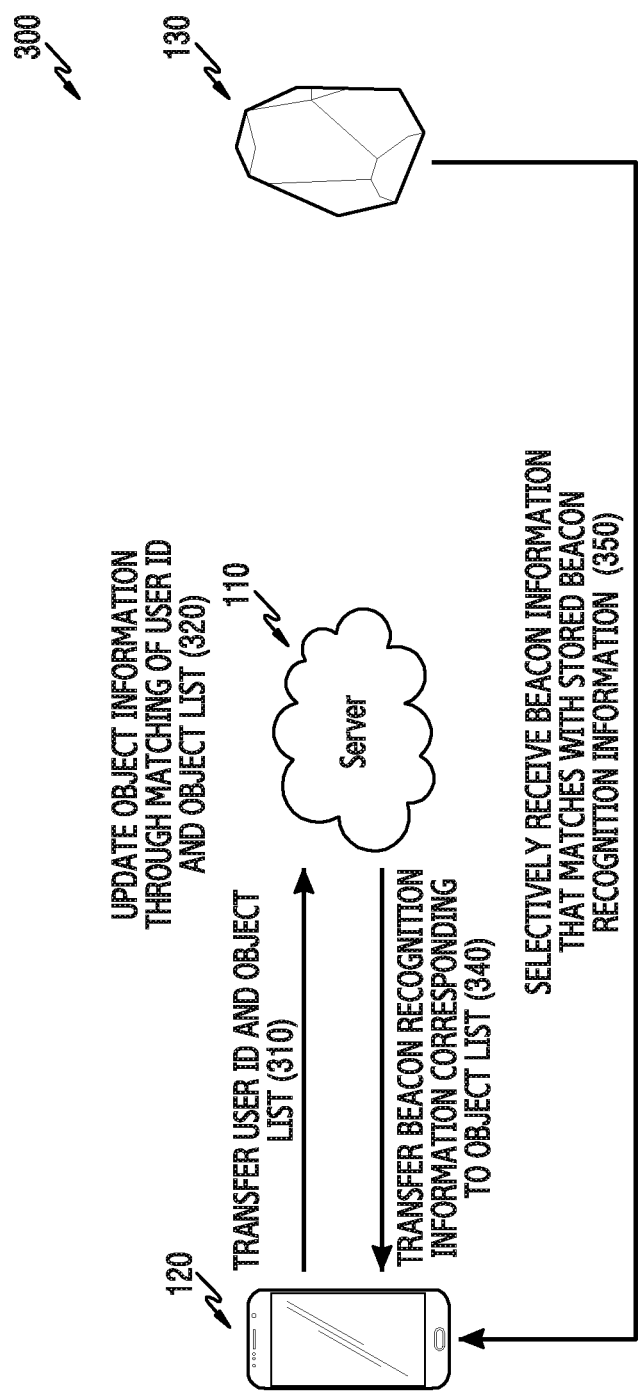
FIG. 3 illustrates a wireless network environment according to various embodiments of the present disclosure.

FIG. 3 illustrates a wireless network environment according to various embodiments of the present disclosure.

Referring to FIG. 3, a network environment 300 includes a server 110, an electronic device 120, and a beacon device 130. The server 110, the electronic device 120, and the beacon device 130 may correspond to the devices described in FIG. 1. In addition, the beacon device 130 may be at least one beacon device.

In operation 310, the electronic device 120 transmits user IDs and a list of objects to the server 110. The list of objects is the list of services the user wants to receive and is stored in the electronic device 120. The list of objects may be stored according to various embodiments described above in FIG. 1. The list of objects may be transmitted to the server 110 in various formats. For example, the list of objects may be transmitted in the form of text, an image, a URL or the like.

Although not shown in FIG. 3, the electronic device 120 transmits the user IDs and the list of objects to the server 110 after satisfying a predetermined condition. For example, the electronic device 120 may transmit the user IDs to the server 110 after the user has entered a predetermined area. The predetermined area may be determined according to various embodiments described above in FIG. 1. Methods for identifying whether the user enters the predetermined area are various.

For example, the other electronic device may be installed at the entrance of a store or building in order to determine whether the user enters or not. The other electronic device may be a beacon device. In this case, the electronic device 120 may receive a message including the identification information from the other electronic device. When receiving the message, the electronic device 120 may recognize that the user has entered the store or building. Then, the electronic device 120 may transmit a signal to the server 110.

For another example, the other electronic device may be a detection device. In this case, the other electronic device may identify whether the user enters the store or building by using a sensing or detecting operation. The other electronic device may notify of whether the user enters the store or building to the server 110. The server 110 may make a request for user IDs or a list of objects to the electronic device 120 after receiving the message indicating whether the user enters or not.

For still another example, the location information on the electronic device 120 can be used to determine whether the user enters or not. The location information may be determined by using a global positioning system (GPS). In this case, the server 110 may measure a position of the electronic device 120 (that is, the user who has the electronic device 120) and make a request for user IDs and a list of objects when the user enters an entrance of a predetermined store or building.

In operation 320, the server 110 may update the information on the object based on the received list of objects and user IDs. The information on the object may be changed by various methods. In some embodiments, the information on the object may be changed based on user state information. The user status information means various states of the user who will use the object. For example, the user state information may include a user's age, occupation, gender, address, field of interest, medical condition, previous purchase history of the product, schedule information, membership information, possessed coupon information, etc. In addition, the information on the object may be changed based on the object state information. The object state information may mean various current states of the objects to be received by the user. For example, the object state information may include coupon information on a product, additional discount information, a location within a store, or the like. The server 110 may update the information on the at least one object included in the received list of objects by reflecting the user state information or the object state information.

In operation 340, the server 110 allocates the beacon recognition information according to the updated information on the object. The beacon recognition information means beacon identification information. The server 110 may transmit the beacon recognition information to the electronic device 120. The beacon recognition information may be transmitted to the electronic device 120 in various formats. For example, the beacon recognition information may be an advertiser address. For another example, the beacon recognition information may be data included in the beacon signal. The electronic device 120 may selectively receive a beacon signal from the beacon device after storing the received beacon recognition information.

In operation 350, the electronic device 120 selectively receives only beacon information that matches with the stored beacon recognition information. Here, an operation of selectively receiving means acquiring only information included in a desired signal from among signals transmitted from two or more beacon devices. That is, in the present disclosure, the selective receiving means selectively processing the information included in the received signals, rather than physically blocking signals other than the desired signal. The method for selectively receiving may vary.

For example, the electronic device 120 may store the beacon recognition information received from the server 110 in a white list of BLE chips and then receive only information of the beacon device having the same beacon identifier as that of the beacon recognition information. In other words, the electronic device 120 receives the beacon signal from the transceiver (shown in FIG. 7) and then determines whether the received beacon signal is a desired signal by using the beacon recognition information. When the received beacon signal is not the desired signal, the electronic device 120 may not transmit the signal to the processor (shown in FIG. 7). The above operation may display, to the user, only information desired by the user, and provide the effect of reducing current consumption of the electronic device 120.

For another example, the electronic device 120 may register the beacon recognition information received from the server 110 in an application of the electronic device 120 and then receive only information of the beacon device having the same beacon identifier as that of the beacon recognition information. In this case, the electronic device 120 may extract only the desired signal information in an application operation (shown in FIG. 7) after receiving all beacon signals from the processor, and display the information notification to the user. The above operation may display only information desired by the user, and provide the effect of simultaneously operating with other applications included in the electronic device 120.

Although not shown in FIG. 3, the electronic device 120 may transmit a message requesting information on the object to the server 110 according to the information of the selectively received beacon signal. The information on the object means detailed information on the object that the user is to purchase or has an interest in rather than merely the identification information on the object. For example, if the object is a product, the information on the object may include various characteristics of the product such as a category, price, color, manufacturer of the product. Further, information on the object may include various pieces of real-time information of the product such as possessed coupon information of the product, additional discount information, and a location within a store. For another example, if the object is a medical service, the information on the object may include information such as information on a doctor in charge, whether the current medical service is available or not, or the like. For still another example, if the object is disaster prevention goods, the information on the object may include information on the detailed location of the disaster prevention goods, a method for using the same, or the like.

The electronic device 120 may transmit a message requesting information on the object to the server 110 according to various methods. For example, the electronic device 120 may transmit the identification information of the object received from the beacon device 130 to the server 110. In this case, the server 110 may transmit information on the object that matches with the received identification information of the object to the electronic device 120. For another example, the electronic device 120 may transmit the identification information of the beacon device 130 to the server 110. In this case, the server 110 may transmit information on the object associated with the beacon device corresponding to the received identification information to the electronic device 120.

Figure 4:
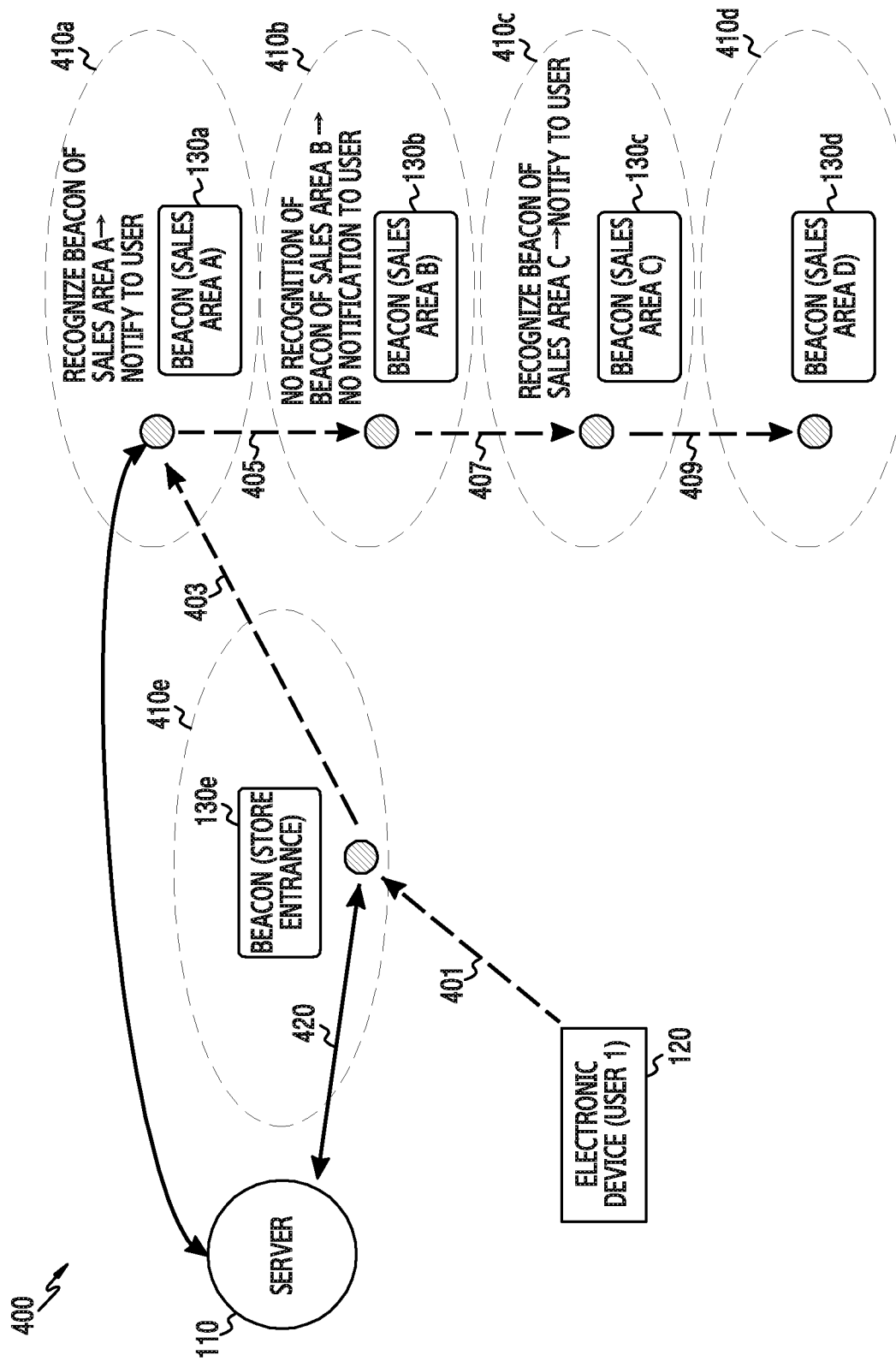
FIG. 4 illustrates a diagram for explaining a method for providing a service according to various embodiments of the present disclosure.

FIG. 4 illustrates a diagram for explaining a method for providing services according to various embodiments of the present disclosure. FIG. 4 illustrates, when an object is a product that the user wants to purchase, a diagram for explaining whether to receive a beacon signal according to a movement of a user of an electronic device 120.

Referring to FIG. 4, the network environment 400 includes a server 110, an electronic device 120, a beacon device 130*a*, a beacon device 130*b*, a beacon device 130*c*, a beacon device 130*d*, and a beacon device 130*e*. For convenience of explanation, an operation of the movement of the user is shown as the movement of the electronic device 120. In addition, each of the beacon devices includes an individual beacon signal effective range. As shown in FIG. 4, the beacon device 130*a*, the beacon device 130*b*, the beacon device 130*c*, the beacon device 130*d*, and the beacon device 130*e* may include a beacon region 410*a*, a beacon region 410*b*, a beacon region 410*c*, a beacon region 410*d*, and a beacon region 410*e*, respectively. When entering within the effective range of each of the beacon signals, the electronic device 120 may receive the beacon signal from the beacon device corresponding to each of the beacon regions. For example, upon entering the beacon region 410*e*, the electronic device 120 may receive the beacon signal from the beacon device 130*e*. In addition, each beacon region may mean a product sales area as well as the effective range of the beacon signal. For example, the beacon region 410*e* may refer to an entrance of a store. For another example, the beacon region 410*a* may mean a product A sales area.

The electronic device 120 moves in the direction of reference numeral 401, reference numeral 403, reference numeral 405, reference numeral 407, and reference numeral 409. The electronic device 120 may move to each of the reference numerals and enter each of the beacon regions. For convenience of explanation, the electronic device 120 may move in the order of the reference numerals 401 to 409, but in some cases, the electronic device 120 may move in the reverse order, and in other cases, the electronic device 120 may move by omitting some reference numerals. For example, the electronic device 120 may move in the order of the beacon region 410d, the beacon region 410c, and the beacon region 410b. For another example, the electronic device 120 may move from the beacon region 410e to the beacon region 410d.

Prior to the moving of the electronic device 120, product items of interest stored in the electronic device 120 are assumed to be A and C. When the electronic device 120 moves to the reference numeral 401 and enters the beacon region 410e (that is, an entrance of the store), the electronic device 120 may recognize the entry to the store. A method for recognizing whether the store is entered may be an operation of recognizing the entry by receiving the beacon signal, as described in FIG. 3, and may be an operation sensed by a separate sensor device. For example, the electronic device 120 may recognize the entry to the store by receiving the beacon signal from the beacon device 130e. When the electronic device 120 enters the store entrance, electronic device 120 may communicate with the server 110 (in reference numeral 420). For example, the electronic device 120 may transmit a message including user IDs and a list of objects to the server 110. For another example, after making a request for the user IDs and the list of objects to the electronic device 120 by the server 110, the electronic device 120 may transmit the message including the information.

The server 110 changes the information on the object based on the received user IDs and list of objects, and allocates the beacon recognition information to the beacon device including identifiers of one or more products. Further, the server 110 may transmit the beacon recognition information to the electronic device 120. The electronic device 120 may selectively receive only a beacon signal that matches with the allocated beacon recognition information. For example, when the electronic device 120 enters the beacon region 410a where product A is sold or the beacon region 410c where product C is sold, the electronic device 120 may receive the beacon signal from the beacon device 130a or the beacon device 130c, respectively, and display the corresponding information to the user. However, when the electronic device 120 enters the beacon region 410b where product B is sold or the beacon region 410d where product D is sold, the electronic device 120 may not receive the beacon signal, or may not provide an information notification to the user after receiving the beacon signal.

As described above, FIG. 4 has been described on an assumption that a user purchases a product, but according to various embodiments, it may be described on an assumption that the user receives a medical service or the user uses disaster prevention goods.

Figure 5:
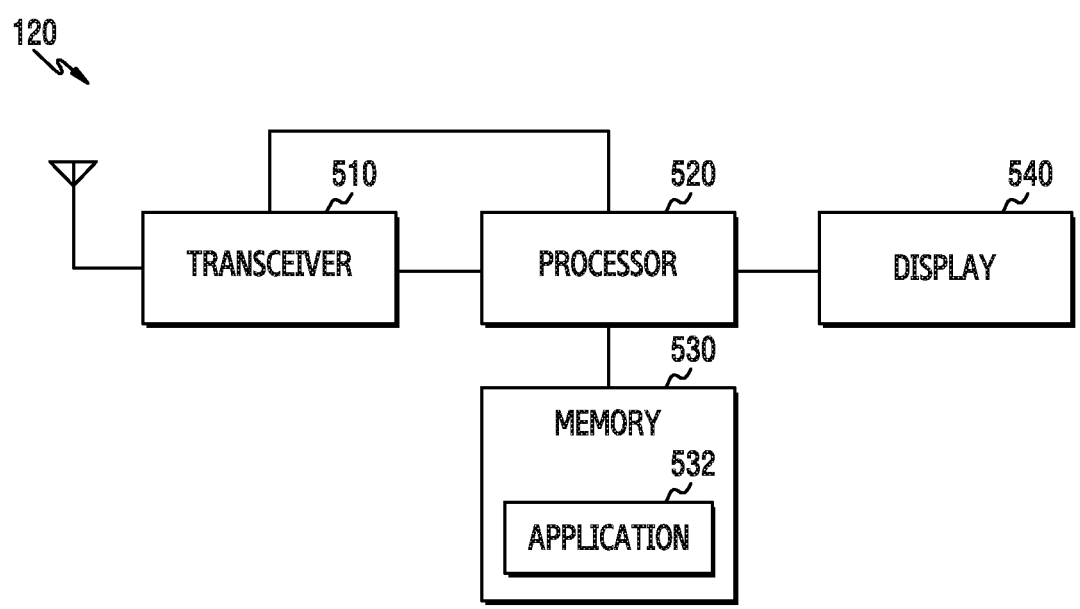
FIG. 5 is a block diagram of an electronic device according to various embodiments of the present disclosure.

FIG. 5 is a block diagram of an electronic device according to various embodiments of the present disclosure. The electronic device shown in FIG. 5 may be the electronic device 120.

Terms such as "~ unit", "~ er" as used hereinafter mean a unit that processes at least one function or operation, and the term may mean hardware, software, or a combination of hardware and software.

Referring to FIG. 5, the electronic device 120 includes a transceiver 510, a processor 520, memory 530, and a display 540. The elements included in the electronic device 120 may be partially omitted, or some elements may be added according to an implementation method.

The transceiver 510 may include a transmitter and/or a receiver. The transmitter and/or receiver performs functions of the transceiver 510 for transmitting/receiving a signal from the server 110 or the beacon device 130 through the antenna. For example, the transceiver 510 performs a function of converting between a baseband signal and bit strings according to the physical layer specification of the system. For example, during data transmission, the transceiver 510 generates complex symbols by encoding and modulating transmission bit strings. In addition, upon receiving the data, the transceiver 510 reconstructs reception bit strings by demodulating and decoding the baseband signal. In addition, the transceiver 510 up-converts the baseband signal into a radio frequency (RF) band signal and then transmits the converted signal through the antenna, and down-converts the RF band signal received through the antenna into the baseband signal. The transceiver 510 may include a transmission filter, a reception filter, an amplifier, a mixer, an oscillator, a digital to analog convertor (DAC), an analog to digital convertor (ADC), or the like.

The processor 520 may control an overall operation of the electronic device 120. The processor 520 may execute applications for providing an internet browser, games, videos and the like. In some embodiments, the processor 520 may include a single processor core (single core) or a plurality of processor cores. For example, the processor 520 may include a multi-core such as dual-core, quad-core, hexa-core, or the like. According to other embodiments, the processor 520 may further include a cache memory located inside or outside thereof.

The processor 520 may be operatively coupled to other elements (e.g., the transceiver 510, the memory 530, and the display 540) within the electronic device 120. The processor 520 may receive a command from other elements of the electronic device 120, interpret the received command, and perform a calculation or process data according to the interpreted command.

The processor 520 may interpret and process the message, data, or signals received from the transceiver 510. The processor 520 may generate a new message, data, or signals based on the received message, data, or signals.

For example, the processor 520 may transmit user IDs or a list of objects to the server 110 through the transceiver 510. The list of objects is a list of services that the user wants to receive and is recorded on the electronic device 120. The list of objects may be transmitted to the server 110 in various formats. For example, the list of objects may be transmitted in the form of text, an image, a URL or the like.

In addition, the processor 520 may receive the allocated beacon recognition information from the server 110 through the transceiver 510. The beacon recognition information means identification information of the beacon device. For example, the beacon recognition information may include an advertiser address of the beacon device.

The processor 520 may receive the beacon signal from the beacon device 130 through the transceiver 510. The processor 520 may selectively receive a beacon signal by using the beacon recognition information.

For example, the processor 520 may store the beacon recognition information received from the server 110, and then receive only information of the beacon device having the same beacon identifier as that of the beacon recognition information. In this case, it may mean that the processor 520 may control the transceiver 510 so as not to transmit an undesired signal to the processor 520.

For another example, the processor 520 may register, in an application 532, the beacon recognition information received from the server 110, and then receive only information of the beacon device having the same beacon identifier as that of the beacon recognition information. In this case, the processor 520 may extract only information on the desired beacon signal at the stage of the application 532 after receiving all beacon signals, so as to display the information notification to the user. For example, the beacon signal information may be an object ID or information for distinguishing the beacon device 130 from other beacon devices.

The processor 520 may transmit a message requesting information on the object to the server 110 through the transceiver 510. The information on the object means detailed information on the object that the user is to purchase or has an interest in rather than merely the identification information on the object.

The processor 520 may transmit the message requesting information on the object to the server 110 through the transceiver 510 according to various methods. For example, the processor 520 may transmit, to the server 110, the identification information of the object received from the beacon device 130 through the transceiver 510. In this case, the server 110 may transmit, to the processor 520, information on the object that matches with the received identification information of the object. For another example, the processor 520 may transmit, to the server 110, the identification information of the beacon device 130 through the transceiver 510. In this case, the server 110 may transmit, to the processor 520, information on the object associated with the beacon device corresponding to the received identification information.

The processor 520 may store, in the memory 530, data or signals received through the transceiver 510, or read or load the data or signals therefrom. For example, the processor 520 may store, in the memory 530, user IDs or a list of objects to be transmitted to the server 110. The processor 520 may load the user IDs and list of objects from the memory 530 in order to transmit the user IDs and list of objects to the server 110.

The processor 520 may store, in the memory 530, the message requesting information on the object to be transmitted to the server 110. The processor 520 may store, in the memory 530, the information on the object received from the server 110.

The processor 520 may process data or signals generated by the application 532. For example, the processor 520 may make a request for data or signals to the memory 530 for the application 532. The processor 520 may record (or store) the data or signals on the memory 530 or update the data or signals for the application 532.

The processor 520 may provide a processed or generated message, data, or signals to the display 540. For example, the processor 520 may extract only information on the desired beacon signal at the stage of the application 532, so as to display a notification message to the user through the display 540. The notification message may be displayed in various methods. For example, the notification message may be text, an image, a video, and a URL. For another example, the processor 520 may display information on the object received from the server 110 to the user through the display 540.

In addition, the processor 520 may recognize the electronic device 120 that enters the stores (e.g., the beacon region to 410e shown in FIG. 4) or a network environment (e.g., the network environment 400 shown in FIG. 4).

The memory 530 may store a control command code, control data, or user data for controlling the electronic device 120. The memory 530 may include at least one of a volatile memory and a nonvolatile memory. The non-volatile memory may include a read only memory (ROM), a programmable ROM (PROM), an electrically programmable ROM (EPROM), an electrically erasable PROM (EEPROM), a flash memory, a phase-change random access memory (PRAM), a magnetic RAM (MRAM), a resistive RAM (RRAM), a ferroelectric RAM (FRAM), and the like. The volatile memory may include at least one of various memories such as a dynamic RAM (DRAM), a static RAM (SRAM), a synchronous DRAM (SDRAM), a PRAM, an MRAM, an RRAM, FeRAM, and the like.

The memory 530 may include a non-volatile medium such as a hard disk drive (HDD), a solid state disk (SSD), an embedded multi media card (eMMC), and a universal flash storage (UFS).

The display 540 may output data or signals. For example, the display 540 may output image data. For another example, the display 540 may display an image signal processed by the processor 520. The display 540 may display a captured or still image, and display videos or a camera preview image. The display 540 may be a liquid crystal display (LCD) or an organic light emitting diode (OLED).

The display 540 is coupled with input/output device so as to be configured to an integrated touch screen. In addition, the display 540 may display the user and a product that the user is carrying or wearing. In this case, the display 540 may perform an electric mirror function.

The memory 530 may include the application 532. The application 532 may process, recorded, or update the data or signals.

Figure 6:
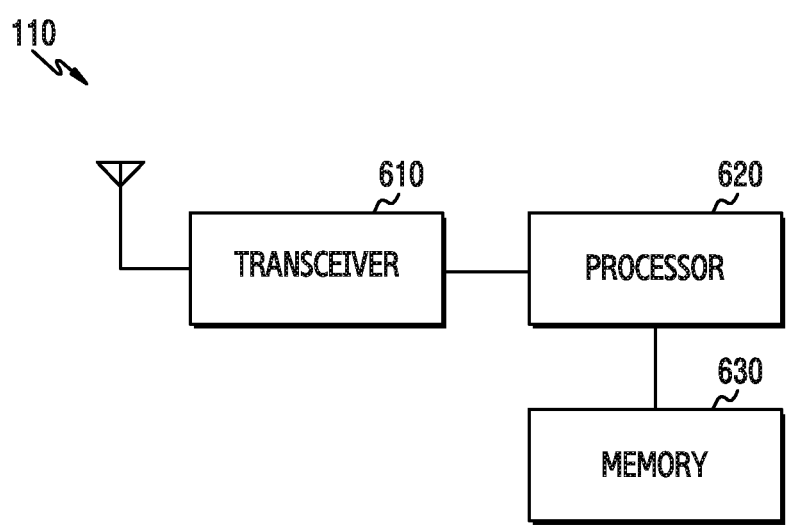
FIG. 6 is a block diagram of a server according to various embodiments of the present disclosure.

FIG. 6 is a block diagram of a server according to various embodiments of the present disclosure. The server shown in FIG. 6 may be a server 110.

Terms such as "unit", "~er" as used hereinafter mean a unit that processes at least one function or operation, and the term may mean hardware, software, or a combination of hardware and software.

Referring to FIG. 6, the server 110 includes a transceiver 610, a processor 620, and a memory 630. The elements included in the electronic device 110 may be partially omitted, or some elements may be added according to an implementation method.

The transceiver 610 may include a transmitter and/or a receiver. The transmitter and/or receiver perform functions of the transceiver 610 for transmitting/receiving a signal from the server 120 or other electronic devices through the antenna. For example, the transceiver 610 performs a function of converting between a baseband signal and bit strings according to the physical layer specification of the system. For example, during data transmission, the transceiver 610 generates complex symbols by encoding and modulating transmission bit strings. In addition, upon receiving the data, the transceiver 610 reconstructs reception bit strings by demodulating and decoding the baseband signal. In addition, the transceiver 610 up-converts the baseband signal into an RF band signal and then transmits the converted signal through the antenna, and down-converts the RF band signal received through the antenna into the baseband signal. The transceiver 610 may include a transmission filter, a reception filter, an amplifier, a mixer, an oscillator, a DAC, an ADC, etc.

The processor 620 may control an overall operation of the server 110. In some embodiments, the processor 620 may include a single processor core or a plurality of processor cores. For example, the processor 620 may include a multi-core such as dual-core, quad-core, and hexa-core. According to other embodiments, the processor 620 may further include a cache memory located inside or outside thereof.

The processor 620 may be operatively coupled to other elements (e.g., the transceiver 610, the memory 630) within the server 110. The processor 620 may receive a command from other elements of the server 110, interpret the received command, and perform a calculation or process data according to the interpreted command.

The processor 620 may interpret and process the message, data, or signals received from the transceiver 610. The processor 620 may generate a new message, data, or signals based on the received message, data, or signals.

For example, the processor 620 may receive user IDs or a list of objects from the electronic device 120 through the transceiver 610. The list of objects is a list of services that the user wants to receive and is recorded on the electronic device 120. The list of objects may be received in various formats. For example, the list of objects may be received in the form of text, an image, a URL or the like.

The processor 620 may update the information on the object based on the received list of objects and user IDs. Here, the information on the object may be updated according to the various embodiments described above in FIG. 3. The processor 620 may update the information on the at least one object included in the received list of objects by reflecting the user state information or the object state information.

The processor 620 may allocate the beacon recognition information according to information on the updated object. The beacon recognition information means beacon identification information. For example, the beacon recognition information may include an advertiser address of the beacon device. The processor 620 may transmit the beacon recognition information to the electronic device 120 through the transceiver 610.

The processor 620 may receive a message requesting information on the object from the electronic device 120 through the transceiver 610. The information on the object means detailed information on the object that the user is to purchase or has an interest in rather than merely the identification information on the object.

The processor 620 may receive the message requesting information on the object from the electronic device 120 through the transceiver 610 according to various methods. For example, the processor 620 may receive, from the electronic device 120, the identification information of the object transmitted from the beacon device 130 to the electronic device 120. In this case, the processor 620 may transmit information on the object that matches with the received identification information of the object to the electronic device 120. For another example, the processor 620 may receive the identification information of the beacon device 130 from the electronic device 120. In this case, the processor 620 may transmit information on the object associated with the beacon device corresponding to the received identification information to the electronic device 120.

The processor 620 may store data or signals received through the transceiver 610 in the memory 630, or read or load the data or signals therefrom. For example, the processor 620 may store the user IDs or list of objects received from the electronic device 120 in the memory 630. In addition, the processor 620 may store information on the changed object and the allocated beacon recognition information in the memory 630.

The processor 620 may store the message requesting information on the object received from the electronic device 120 in the memory 630. The processor 620 may load information on the object corresponding to the received request message from the memory 630. The information on the object means the detailed information on the object rather than merely the identification information of the product.

In addition, the processor 620 may recognize the electronic device 120 that enters the stores (e.g., the beacon region to 410e shown in FIG. 4) or a network environment (e.g., the network environment 400 shown in FIG. 4).

The memory 630 may store a control command code, control data, or user data for controlling the server 110. The memory 630 may include at least one of a volatile memory and a nonvolatile memory. The non-volatile memory may include a ROM, a PROM, an EPROM, an EEPROM, a flash memory, a PRAM, an MRAM, an RRAM, an FeRAM, and the like. The volatile memory may include at least one of various memories such as a DRAM, an SRAM, an SDRAM, a PRAM, an MRAM, an RRAM, FeRAM, and the like.

The memory 630 may include a non-volatile medium such as an HDD, an SSD, an eMMC, and a UFS.

Figure 7:
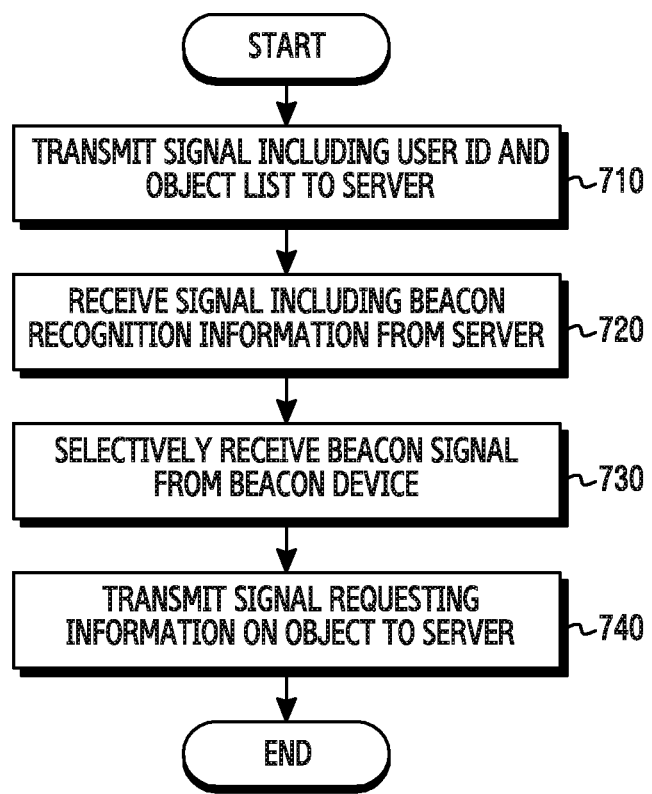
FIG. 7 is a flow chart illustrating an operation of an electronic device for receiving a service according to various embodiments of the present disclosure.

FIG. 7 is a flow chart illustrating an operation of an electronic device for receiving a service according to various embodiments of the present disclosure. The electronic device may be an electronic device 120.

Referring to FIG. 7, in operation 710, the electronic device 120 may transmit a signal including user IDs and a list of objects to the server 110. The electronic device 120 may transmit the user IDs and list of objects to the server 110 at the same time or separately. The server 110 may determine a destination terminal for transmitting a signal including beacon recognition information by using the received user IDs. Although not shown in FIG. 9, the electronic device 120 may recognize whether the store is entered and then transmit the signal to the server 110. A method for recognizing whether the store is entered was described above in FIG. 4. The server 110 will allocate the beacon recognition information associated with the object desired by the user based on the received user IDs and list of objects.

In operation 720, the electronic device 120 receives a signal including the allocated beacon recognition information from the server 110. The beacon recognition information means identification information of the beacon device. For example, the beacon recognition information may be an advertiser address.

In operation 730, the electronic device 120 selectively receives a beacon signal from the beacon device 130 based on the allocated beacon recognition information. A flow of an operation for selectively receiving a beacon signal will be described again later in FIGS. 12 and 13. The beacon signal includes schematic information on the object. For example, the beacon signal may include an object ID or information for distinguishing the beacon device 130 from other beacon devices. The user does not need to receive all beacon signals from the beacon device in order to acquire all pieces of information. The electronic device 120 may not receive the beacon signal not desired by the user, or even if the electronic device 120 receives the beacon signal not desired by the user, it may not display an information notification message to the user.

In operation 740, the electronic device 120 may transmit a signal requesting information on the object associated with the selectively received beacon signal to the server 110. In other words, the user may receive only information on a desired object (for example, a product described in a list of products) from the server 110. Although not shown in FIG. 9, the electronic device 120 will receive a signal including information on the object from the server 110.

Figure 8:
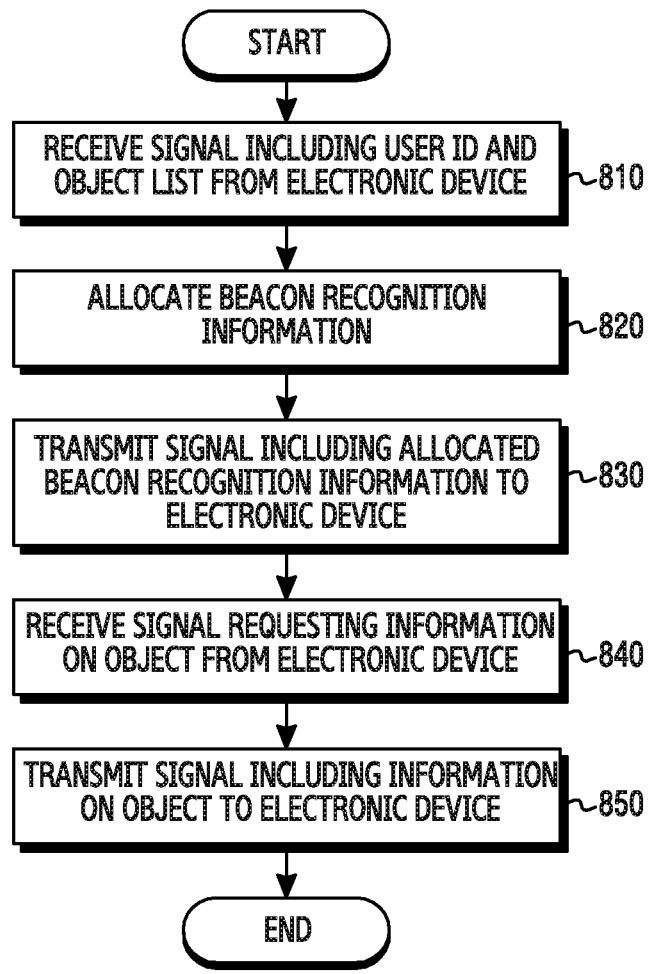
FIG. 8 is a flow chart illustrating an operation of a server for providing a service according to various embodiments of the present disclosure.

FIG. 8 is a flow chart illustrating an operation of a server for providing a service according to various embodiments of the present disclosure. The server may be a server 110.

Referring to FIG. 8, in operation 810, the server 110 may receive a signal including user IDs and a list of objects from the electronic device 120. The server 110 may simultaneously or separately receive user IDs and a list of objects from the electronic device 120. The server 110 may determine a destination terminal for transmitting a signal including the beacon recognition information by using the received user IDs. Although not shown in FIG. 8, the server 110 may receive the signal after recognizing whether the electronic device 120 enters the store.

In operation 820, the server 110 allocates the beacon recognition information according to the received list of objects. A flow of an operation for allocating the beacon recognition information will be described again in FIG. 15. The beacon recognition information means identification information of the beacon device. For example, the beacon recognition information may be an advertiser address. In operation 830, the server 110 may transmit a signal including the allocated beacon recognition information to the electronic device 120.

In operation 840, the server 110 receives the signal requesting information on the object from the electronic device 120. The information on the object may be stored in advance in the server 110. For example, the server 110 may correspond to big data and include information on the object. For another example, the server 110 may be linked to a server corresponding to other big data, receive information on objects from the big data, and transmit the information to the electronic device 120.

In operation 850, the server 110 may transmit the signal including information on the object to the electronic device 120. Here, the object corresponds to an object requested by the electronic device 120 in operation 840. In other words, the server 100 may provide, to the user, only information on the object (for example, a product described in a list of products) desired by the user.

Figure 9:
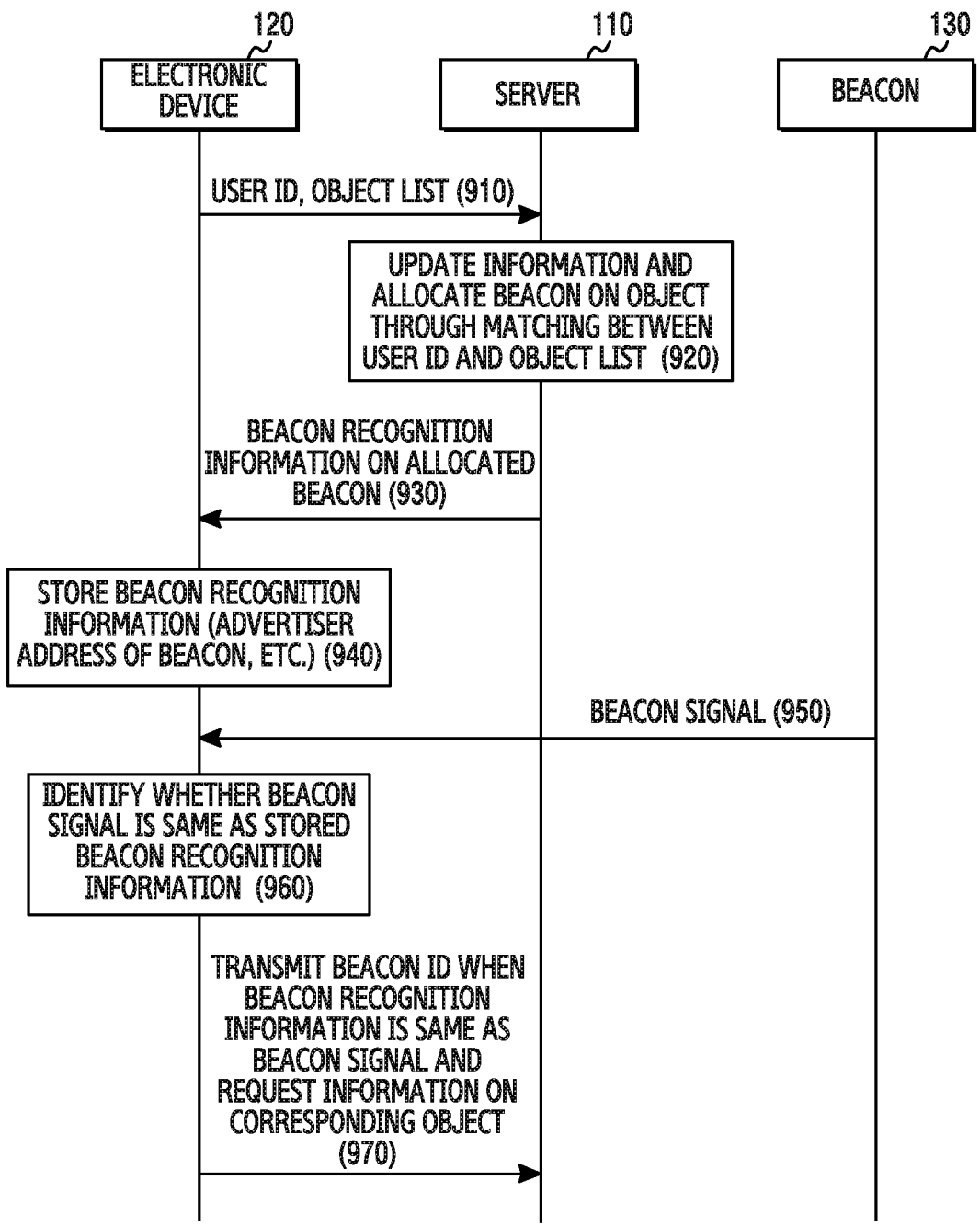
FIG. 9 illustrates a signal flow for providing a service according to various embodiments of the present disclosure.

FIG. 9 illustrates a signal flow for providing a service according to various embodiments of the present disclosure. FIG. 9 illustrates an overall signal flow of a server 110, an electronic device 120, and a beacon device 130.

For convenience of description, an operation of a single electronic device 120 and beacon device 130 is exemplified in the drawing, but each of the electronic device 120 and the beacon device 130 may be two or more devices. That is, the server 110 may communicate simultaneously or sequentially with two or more electronic devices, and the electronic device may sequentially communicate with two or more beacon devices.

Referring to FIG. 9, in operation 910, the electronic device 120 may transmit a signal including user IDs and a list of objects to the server 110. Although not shown in FIG. 9, the electronic device 120 may transmit the signal including the user IDs and list of objects to the server 110 after recognizing an entering or not to the store.

In operation 920, the server 110 updates information on the object through the matching between the received user IDs and the list of objects, and allocates beacon recognition information. The matching means a process of checking a product included in the list of objects, changing the information on the object, and allocating beacon recognition information.

In operation 930, the server 110 may transmit a signal including the allocated beacon recognition information to the electronic device 120. The beacon recognition information may be recognition information on two or more beacon devices.

In operation 940, the electronic device 120 stores the received beacon recognition information. For example, electronic device 120 may store an advertiser address of the beacon device. According to an embodiment, the electronic device 120 may store the beacon recognition information in hardware such as a BLE chip and the application 532.

In operation 950, the electronic device 120 receives a beacon signal from the beacon device 130, and determines whether the received beacon signal is the same as the stored beacon recognition information in operation 960. That is, the electronic device 120 may receive only a beacon signal that matches with the stored beacon recognition information among the beacon signals transmitted by two or more beacon devices. According to embodiments, the operation 950 and operation 960 may be simultaneously or sequentially performed. For example, when the electronic device 120 checks a beacon signal by using the beacon recognition information stored in the BLE chip, the electronic device 120 may not receive an undesired signal. Here, "not receive" means that the transceiver 510 receives a signal but the signal is not transmitted to the processor 520. For another example, when the electronic device 120 checks a beacon signal by using the beacon recognition information stored in the application 532, the electronic device 120 may not display information on an undesired signal among the received beacon signal to the user.

In operation 970, the electronic device 120 may transmit the ID of the beacon device which is the same as the beacon recognition information to the server 110 so as to request for information on the object. According to other embodiments, the electronic device 120 may transmit the ID of the object to the server 110 so as to make a request for the information on the object.

Figure 10:
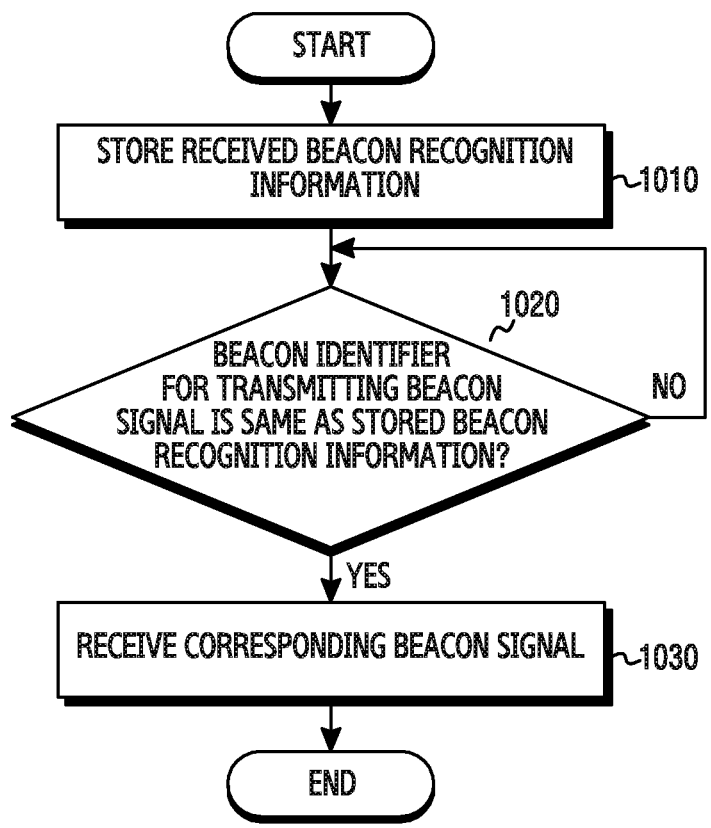
FIG. 10 is a flow chart illustrating an operation of an electronic device for selectively receiving a signal according to an embodiment of the present disclosure.

FIG. 10 is a flow chart illustrating an operation of an electronic device for selectively receiving a signal according to an embodiment of the present disclosure. The electronic device may be an electronic device 120. FIG. 10 shows a flow of a detailed operation of the operation 730 shown in FIG. 7.

Referring to FIG. 10, in operation 1010, the electronic device 120 stores the beacon recognition information received from the server 110. For example, the beacon recognition information may be stored in the BLE chip included in the electronic device 120.

In operation 1020, the electronic device 120 may determine whether the beacon identifier that transmits a beacon signal is the same as the stored beacon recognition information. If the beacon identifier is not the same as the beacon recognition information, the electronic device 120 does not receive the signal. When the beacon identifier is the same as the beacon recognition information, the electronic device 120 receives the signal in operation 1030.

Figure 11:
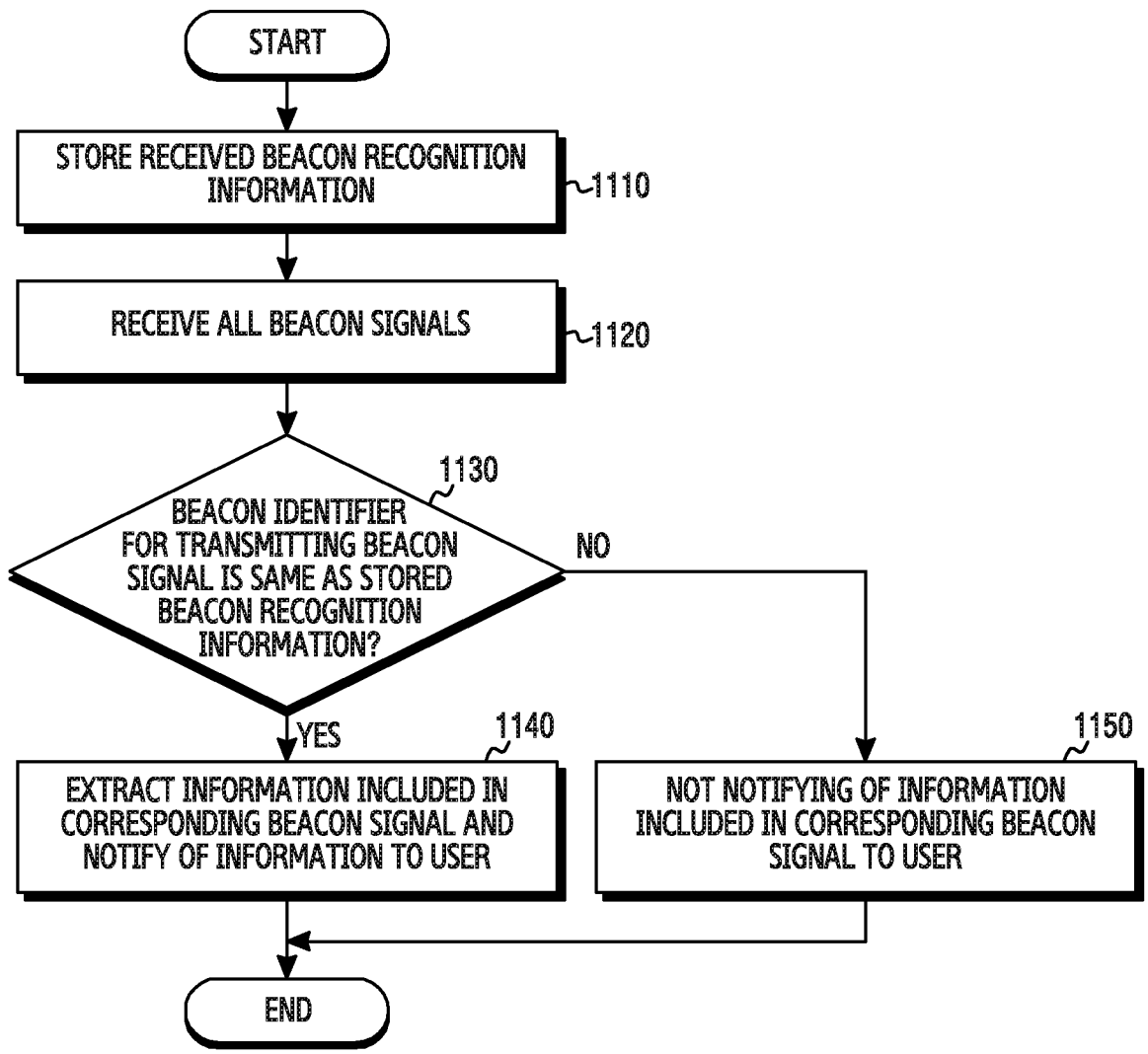
FIG. 11 is a flow chart illustrating an operation of an electronic device for selectively receiving a signal according to an embodiment of the present disclosure.

FIG. 11 is a flow chart illustrating an operation of an electronic device for selectively receiving a signal according to an embodiment of the present disclosure. The electronic device may be an electronic device 120. FIG. 11 shows a flow of a detailed operation of the operation 730 shown in FIG. 7.

Referring to FIG. 11, in operation 1110, the electronic device 120 stores the beacon recognition information received from the server 110. For example, the beacon recognition information may be stored in the application 532 included in the electronic device 120.

In operation 1120, the electronic device 120 receives all beacon signals from the beacon device 130. Here, all beacon signals mean receiving all the beacon signals transmitted from two or more beacon devices.

In operation 1130, the electronic device 120 may determine whether the beacon identifier that transmits a beacon signal is the same as the stored beacon recognition information. If the beacon identifier is not the same as the beacon recognition information, the electronic device 120 does not notify of the information included in the beacon signal to the user in operation 1150. When the beacon identifier is the same as the beacon recognition information, the electronic device 120 extracts information included in the beacon signal so as to display to the user in operation 1140. For example, the information included in the beacon signal may be a product ID or information for distinguishing the beacon device 130 from other beacon devices. The user will make a request for the information on the desired object to the server 110 by using the displayed information.

Figure 12:
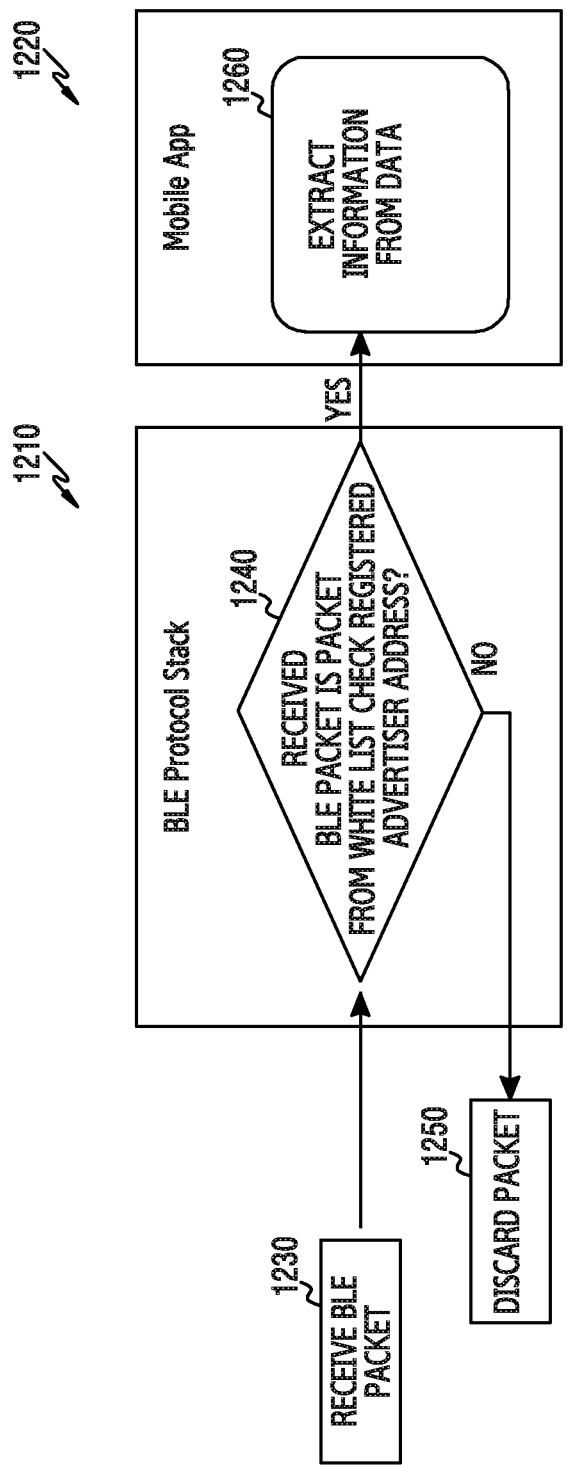
FIG. 12 is a flow chart illustrating an overall operation of an electronic device for selectively receiving a signal according to various embodiments of the present disclosure.

FIG. 12 is a flow chart illustrating an operation of an electronic device for selectively receiving a signal according to various embodiments of the present disclosure. The electronic device may be an electronic device 120.

Operation 1210 shown in FIG. 12 may correspond to the operation performed by the transceiver 510, and operation 1220 may correspond to the operation performed by the application 532.

According to an embodiment, a flow of an operation illustrated in FIG. 12 may correspond to the embodiment of FIG. 10 as described below.

In operation 1230, the electronic device 120 receives a BLE packet. The BLE packet refers to a beacon signal. In operation 1240, the electronic device 120 determines whether the received BLE packet is the packet from the registered beacon recognition information. For example, the beacon recognition information may be an advertiser address. The beacon recognition information is recognition information registered in a white list on the BLE chip. The white list refers to the beacon recognition information allocated based on a list of objects transmitted to the server 110 by the electronic device 120.

In operation 1250, the electronic device 120 discards the packet if the received BLE packet is not the same as the BLE beacon recognition information registered in the white list. When the received BLE packet is the same as the beacon recognition information registered in the white list, the electronic device 120 transfers the packet to the application 532 through the processor 520.

In operation 1260, the electronic device 120 extracts information included in the packet transferred using the application 532. The information included in the packer may be an object ID or information for distinguishing the beacon device 130 from other beacon devices.

According to an embodiment, the flow of an operation illustrated in FIG. 12 may correspond to the embodiment of FIG. 11 as described below. Although not directly shown in FIG. 12, the electronic device 120 may omit operation 1240. In this case, all of the BLE packets received in operation 1230 are transmitted through the transceiver to the application 532.

Although not directly shown in FIG. 12, the electronic device 120 may determine whether the received BLE packets are from the registered beacon information in operation 1260. For example, the beacon recognition information may be an advertiser address. The beacon recognition information is beacon recognition information registered in a white list on the application 532.

When the received BLE packet is not the same as the BLE beacon recognition information registered in the white list, the electronic device 120 does not extract the information of the packet. In other words, the electronic device 120 may not display the information of the packet to the user.

When the received BLE packet is the same as the BLE beacon recognition information registered in the white list, the electronic device 120 extracts the information included in the packet. The information included in the packer may be an object ID or information for distinguishing the beacon device 130 from other beacon devices.

Figure 13:
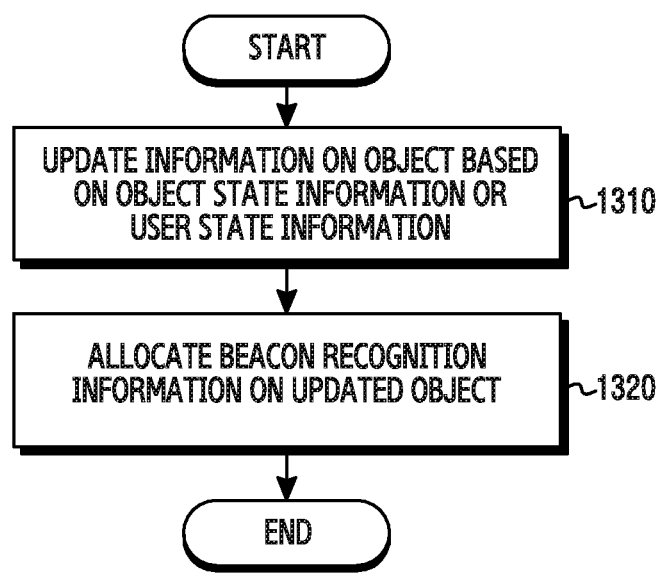
FIG. 13 is a flow chart illustrating an operation of a server for allocating beacon recognition information according to various embodiments of the present disclosure.

FIG. 13 is a flow chart illustrating an operation of a server for allocating beacon identification information according to various embodiments of the present disclosure. The server may be a server 110. FIG. 13 shows a flow of a detailed operation of the operation 820 shown in FIG. 8.

Referring to FIG. 13, in operation 1310, the server 110 may update the information on the object based on the received list of objects and user IDs received from the electronic device 120. For example, the information on the object may be changed based on user state information. In addition, the information on the object may be changed based on the object state information. The server 110 may change the information on the object included in the received list of objects by reflecting the user state information or the object state information.

In operation 1320, the server 110 allocates the beacon recognition information of the updated object. That is, the server 110 may transmit the identification information on the beacon device corresponding to the changed information on the object to the electronic device 120. The electronic device 120 may selectively receive a beacon signal from the beacon device after storing the received beacon recognition information.

Methods stated in claims and/or specifications according to various embodiments may be implemented by hardware, software, or a combination of hardware and software.

The software may be stored in a non-transitory computer readable storage medium. The non-transitory computer readable storage medium stores at least one program (software module) including instructions that, when executed by at least one processor in an electronic device, causes the processor to execute methods of the present disclosure.

The software may be stored in an optical or magnetically readable medium such as a compact disc ROM (CD-ROM), a digital versatile disc (DVD), a magnetic disc or a magnetic tape, or the like, in a form of a volatile or a non-volatile storage device such as a ROM, or in a form of a memory such as a RAM, memory chips, device or integrated circuits.

Storage devices and storage media are embodiments of a non-transitory computer readable storage medium which is capable of storing a program or programs including instructions that implement the embodiments when executed. Embodiments provide a program including a code for implementing a device or a method as claimed in any one of the claims of this specification, and a non-transitory computer readable medium for storing a program. In addition, the program may be electronically transferred through a medium such as a communication signal transferred via a wired or wireless connection, and embodiments may suitably include the equivalents thereof.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating an electronic device, the method comprising:
 transmitting, to a server, a first signal including a list of one or more objects;
 receiving, from the server, a second signal including beacon recognition information of an object included in the list;
 storing the beacon recognition information at a memory of the electronic device;
 receiving a beacon signal from a beacon device;
 determining, by the electronic device, whether the received beacon signal matches the stored beacon signal recognition information received from the server;
 if the received beacon signal matches the stored beacon recognition information, requesting information of the object from the server; and
 displaying the information of the object from the server.

2. The method of claim 1, wherein the first signal is transmitted when the electronic device enters a predetermined area.

3. The method of claim 1, wherein the server updates the information based on at least one of object state information or user state information.

4. The method of claim 3,
 wherein the object state information comprises at least one of coupon information on a product, additional discount information, or a location within a store, and
 wherein the user state information comprises at least one of a user's age, occupation, gender, address, field of interest, medical condition, previous history of the product purchased, schedule information, membership information, and possessed coupon information.

5. The method of claim 1, wherein the information comprises a location of the object.

6. The method of claim 1, wherein the information comprises at least one of a physical description of the object or discount information of the object.

7. An electronic device comprising:
 a memory;
 a transceiver configured to transmit and receive a signal; and
 a processor functionally coupled to the transceiver,
 wherein the processor is configured to control to:
  transmit, to a server, a first signal including a list of one or more objects,
  receive, from the server, a second signal including beacon recognition information of an object included in the list,
  store the beacon recognition information at the memory,
  receive a beacon signal from a beacon device,
  determine, by the electronic device, whether the received beacon signal matches the stored beacon signal recognition information received from the server,
  if the received beacon signal matches the stored beacon recognition information, request information of the object from the server, and
  display the information of the object from the server.

8. The electronic device of claim 7, wherein the processor is further configured to transmit the first signal when the electronic device enters a predetermined area.

9. The electronic device of claim 7, wherein the server updates the information based on at least one of object state information or user state information.

10. The electronic device of claim 9,
 wherein the object state information comprises at least one of coupon information on a product, additional discount information, or a location within a store, and
 wherein the user state information comprises at least one of a user's age, occupation, gender, address, field of interest, medical condition, previous purchase history of the product, schedule information, membership information, or possessed coupon information.

11. The electronic device of claim 7, wherein the information comprises a location of the object.

12. The electronic device of claim 11, wherein the information comprises at least one of a physical description of the object or discount information of the object.

13. The method of claim 1, wherein the beacon recognition information is stored on a bluetooth low energy (BLE) chip.

14. The electronic device of claim 7, wherein the beacon recognition information is stored on a bluetooth low energy (BLE) chip.

* * * * *